(12) United States Patent
Versteegh

(10) Patent No.: US 9,121,386 B2
(45) Date of Patent: *Sep. 1, 2015

(54) WIND TURBINE AND A DIRECT-DRIVE GENERATOR

(75) Inventor: Cornelis Johannes Antonius Versteegh, Hilversum (NL)

(73) Assignee: XEMC DARWIND B.V., Hilversum (NL)

( * ) Notice: Subject to any disclaimer, the term of this patent is extended or adjusted under 35 U.S.C. 154(b) by 4 days.

This patent is subject to a terminal disclaimer.

(21) Appl. No.: 13/257,025

(22) PCT Filed: Mar. 19, 2010

(86) PCT No.: PCT/NL2010/000049
§ 371 (c)(1),
(2), (4) Date: Oct. 18, 2011

(87) PCT Pub. No.: WO2010/107306
PCT Pub. Date: Sep. 23, 2010

(65) Prior Publication Data
US 2012/0049535 A1    Mar. 1, 2012

(30) Foreign Application Priority Data

Mar. 19, 2009  (NL) .................................. 1036730
Apr. 6, 2009   (NL) .................................. 1036821

(51) Int. Cl.
*F03D 9/00* (2006.01)
*F03D 7/02* (2006.01)
(Continued)

(52) U.S. Cl.
CPC .............. *F03D 7/0248* (2013.01); *F03D 9/002* (2013.01); *H02K 1/185* (2013.01); *H02K 1/20* (2013.01);
(Continued)

(58) Field of Classification Search
CPC ....... Y02E 10/725; H02K 29/22; H02K 1/148
USPC .................................. 290/44, 55; 310/52, 64
See application file for complete search history.

(56) References Cited

U.S. PATENT DOCUMENTS 5,877,576 A * 3/1999 CoChimin .................... 310/418
6,467,725 B1  10/2002 Coles
(Continued)

FOREIGN PATENT DOCUMENTS

CN    101222159      7/2008
DE    1 808 577   *  8/1969
(Continued)

OTHER PUBLICATIONS

Official Search Report and Written Opinion of the European Patent Office in counterpart foreign application No. PCT/NL2010/000049 filed Mar. 19, 2010.

(Continued)

*Primary Examiner* — Tulsidas C Patel
*Assistant Examiner* — Sean Gugger
(74) *Attorney, Agent, or Firm* — Steven M. Koehler; Westman, Champlin & Koehler, P.A.

(57) ABSTRACT

The invention relates to a wind turbine of the horizontal axis, direct-drive type, wherein the wind turbine comprises a hub provided with one or more blades, a generator with a centerline that is technically horizontal, the generator comprising an inner rotor which is driven by the hub and an outer stator, the stator comprising a front plate, a back plate and stacked, arcuate laminates. The wind turbine according to the invention is characterized in that the front plate and the back plate are connected by tension rods so as to form a stator unit with the stacked, arcuate laminates being sandwiched between the back plate and the front-plate under compression, wherein of a first arcuate laminate in contact with a second arcuate laminate stacked against it the outer edge of the first arcuate laminate is at a larger distance from the centerline of the generator than the outer edge of the second arcuate laminate so as to increase the outer surface area of the stator for dissipating heat to the atmosphere. The invention also relates to a direct-drive generator.

18 Claims, 3 Drawing Sheets

(51) Int. Cl.
   *H02K 1/18* (2006.01)
   *H02K 1/20* (2006.01)
   *H02K 9/14* (2006.01)
   *H02K 7/18* (2006.01)
   *H02K 1/16* (2006.01)
   *H02K 9/02* (2006.01)

(52) U.S. Cl.
   CPC ............... *H02K 7/1838* (2013.01); *H02K 9/14* (2013.01); *F05B 2220/7066* (2013.01); *F05B 2260/20* (2013.01); *H02K 1/16* (2013.01); *H02K 9/02* (2013.01); *Y02E 10/723* (2013.01); *Y02E 10/725* (2013.01)

(56) References Cited

U.S. PATENT DOCUMENTS

| | | | |
|---|---|---|---|
| 7,431,567 | B1 | 10/2008 | Bevington |
| 2001/0035651 | A1 | 11/2001 | Umemoto |
| 2004/0179934 | A1 | 9/2004 | Wobben |
| 2006/0066110 | A1 | 3/2006 | Jansen |
| 2006/0284511 | A1* | 12/2006 | Evon et al. ............. 310/216 |
| 2008/0265585 | A1 | 10/2008 | Torres Martinez |
| 2009/0026771 | A1* | 1/2009 | Bevington et al. ........... 290/55 |
| 2009/0224544 | A1* | 9/2009 | Bartlett ..................... 290/52 |
| 2010/0289348 | A1 | 11/2010 | Gruendl |
| 2012/0056435 | A1 | 3/2012 | Versteegh |

FOREIGN PATENT DOCUMENTS

| | | |
|---|---|---|
| DE | 1808577 | 8/1969 |
| EP | 1641102 | 3/2006 |
| EP | 1988282 | 11/2008 |
| FR | 2793084 | 11/2000 |
| GB | 573773 | 12/1945 |
| JP | 58192453 | 11/1983 |
| JP | 60204236 | 10/1985 |
| WO | WO 00/74214 | 12/2000 |
| WO | WO 02/095222 | 11/2002 |
| WO | WO 2009/091248 | 7/2009 |
| WO | WO 2009091248 A2 * | 7/2009 |

OTHER PUBLICATIONS

Official Search of the European Patent Office in counterpart foreign priority application No. NL1036821 filed Apr. 6, 2009.
Official Search Report and Written Opinion of the European Patent Office for foreign application No. PCT/NL2010/000048 filed Mar. 19, 2010.
Official Search of the European Patent Office for foreign application No. NL1036733 filed Mar. 19, 2009.

* cited by examiner

WIND TURBINE AND A DIRECT-DRIVE GENERATOR

CROSS-REFERENCE TO RELATED APPLICATION

This application is a Section 371 National Stage Application of International Application PCT/NL2010/000049 filed Mar. 19, 2010 and published as WO/2010/107306 in English.

BACKGROUND

The discussion below is merely provided for general background information and is not intended to be used as an aid in determining the scope of the claimed subject matter.

Aspects of the present invention relate to a wind turbine of the horizontal axis, direct-drive type, wherein the wind turbine comprises
a hub provided with one or more blades,
a generator with a centerline that is technically horizontal, the generator comprising an inner rotor which is driven by the hub and an outer stator, the stator comprising a front plate, a back plate and stacked, arcuate laminates.

There is a trend toward larger and larger wind turbines. A major problem designing larger wind turbines is the way power and weight scale. A hypothetical doubling of the length of the rotor diameter of a wind turbine will square its output, but increase its weight with a power of three. An increase in weight has a detrimental effect, in that it increases cost tremendously. This has an adverse effect on the cost of the electricity produced with the wind turbine. Thus, there is a major challenge to design a wind turbine that is both strong and light (for its size).

SUMMARY

This Summary and the Abstract herein are provided to introduce a selection of concepts in a simplified form that are further described below in the Detailed Description. This Summary and the Abstract are not intended to identify key features or essential features of the claimed subject matter, nor are they intended to be used as an aid in determining the scope of the claimed subject matter. The claimed subject matter is not limited to implementations that solve any or all disadvantages noted in the Background.

A wind turbine includes a front plate and a back plate are connected by tension rods so as to form a stator unit with stacked, arcuate laminates being sandwiched between the back plate and the front-plate under compression, wherein of a first arcuate laminate in contact with a second arcuate laminate stacked against it the outer edge of the first arcuate laminate is at a larger distance from the centerline of the generator than the outer edge of the second arcuate laminate so as to increase the outer surface area of the stator for dissipating heat to the atmosphere.

A major saving in weight is achieved by eliminating the shell, allowing the heat from the generator to dissipate into the atmosphere via the protruding first arcuate laminate, and preferably first arctuate laminates. The arcuate laminates provide for the structural integrity of the generator, more specifically of the stator. In general, one of the front plate and the back plate, usually the back plate, will be provided directly or indirectly (usually via a carrier cone) with one or more bearings, an outer bearing of which is connected to the rotor of the generator. Direct-drive generators tend to have a very large diameter. For this reason, the laminates are generally arcuate segments placed end-to-end. Generally, the laminate segments will independently be of a size of 360°/n where n is an integer ≥2. They are generally placed staggered (i.e. overlapping) with respect to each other to provide the greatest mechanical strength. The stack will usually be impregnated with a resin, for example using vacuum pressure impregnation. U.S. Pat. No. 6,467,725 in the name of Lucas Industries Ltd discloses an electrical generator for use with a gas turbine, the rotor of which comprises a stack of laminations held under compressive load. It is mentioned that it is advantageous if the stator is made of laminates as well. Laminates, or laminations as they are also called, are quite thin, such as in the order of 0.2 mm. The term "technically horizontal" means that the centerline of the generator makes an angle with the horizontal of up to +15°, in practice usually +4-8°. The expression "the outer edge of the first arcuate laminate is at a larger distance from the centerline of the generator than the outer edge of the second arcuate laminate" means that, as seen in the direction of the centerline, a rotational angle exists where the distance the outer edge of an arcuate laminate is at a larger distance from the centerline of the generator than the outer edge of a second arcuate laminate immediately adjacent to it in the direction of the centerline (i.e. stacked against it).

According to one embodiment, there is a first series of arcuate laminates having an outer edge at a first distance from the centerline of the generator sandwiched between a second series and another second series of arcuate laminates having an outer edge at a second distance from the centerline of the generator, the first distance being larger than the second distance, the first series forming a cooling rib.

In practice, there will be more than one cooling rib (formed by multiple first series). Such a wind turbine can be cheap because of savings on the generator, thanks to the laminates being of a simple design.

According to one embodiment, the outer surface of the stator is covered with a water-impermeable protective coating.

This helps to ensure the longevity of the generator, which is especially important for placement of wind turbines at sea, where the cost of maintenance is very high.

According to one embodiment, the arcuate segments have at least one through-hole, and the tension rods pass through the through-holes.

This allows for a very rigid stator structure.

According to one embodiment, the back plate has a sandwich structure.

This brings the weight of the generator even further down.

According to one embodiment, the centerline of the generator is at an angle of >2° to the horizontal.

This helps to ensure that water runs of the outside of the stator, improving the longevity of the generator and reducing the cost of maintenance.

An aspect of the present invention also relates to a direct-drive generator comprising an inner rotor and an outer stator, the stator comprising a front plate, a back plate and stacked, arcuate laminates, wherein the front plate and the back plate are connected by tension rods so as to form a stator unit with the stacked arcuate laminates being sandwiched between the back plate and the front-plate under compression, wherein of a first arcuate laminate in contact with a second arcuate laminate stacked against it the outer edge of the first arcuate laminate is at a larger distance from the centerline of the generator than the outer edge of the second arcuate laminate so as to increase the outer surface area of the stator for dissipating heat to the atmosphere.

This generator is very suitable for wind turbines or other open-air applications. The favorable embodiments of the generator as discussed in the subclaims are incorporated by reference, their advantages being already discussed for the wind turbine above, and incorporated by reference.

BRIEF DESCRIPTION OF THE DRAWINGS

Aspects of the invention will now be illustrated with reference to the drawing, wherein.

DETAILED DESCRIPTION OF THE ILLUSTRATIVE EMBODIMENTS

Figure 1:
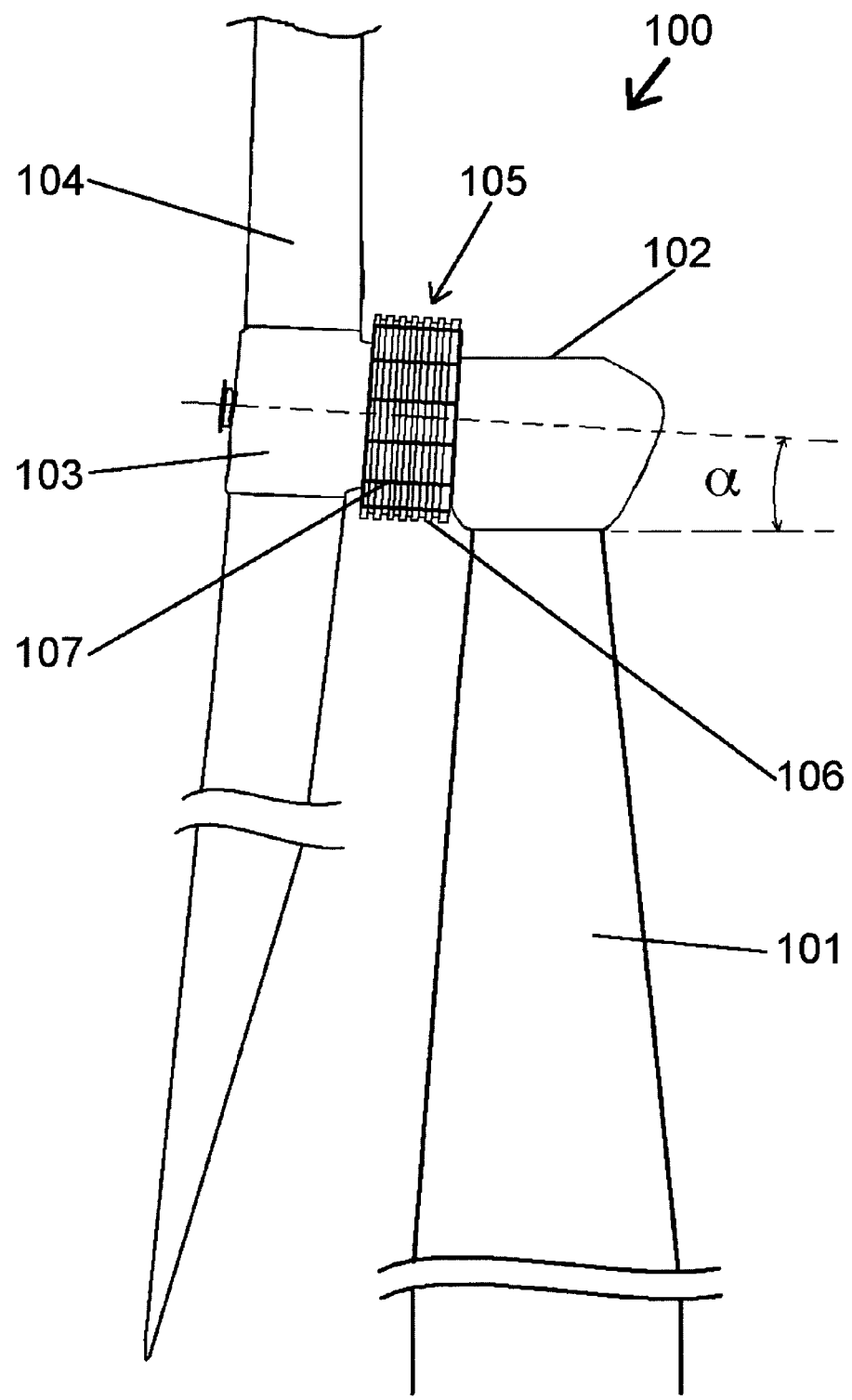
FIG. 1 shows the top part of a wind turbine.

FIG. 1 shows a wind turbine 100 with a tower 101, a nacelle 102, a hub 103 and blades 104. The nacelle 102 comprises a direct drive generator 105 with concentric cooling ribs 106 and strengthening ribs 107. The hub 103 and generator 105 are at an angle of 6° to the horizontal, allowing any rainwater falling on the generator 105 to be drained easily. The cooling ribs 106 are formed by first series of stacked laminates (this is shown symbolically in FIG. 3), between second and another second series of stacked laminates, the former having an outer edge that is at a larger distance from the centerline than the outer edges of the laminates of the second and another second series of stacked laminates.

Figure 2:
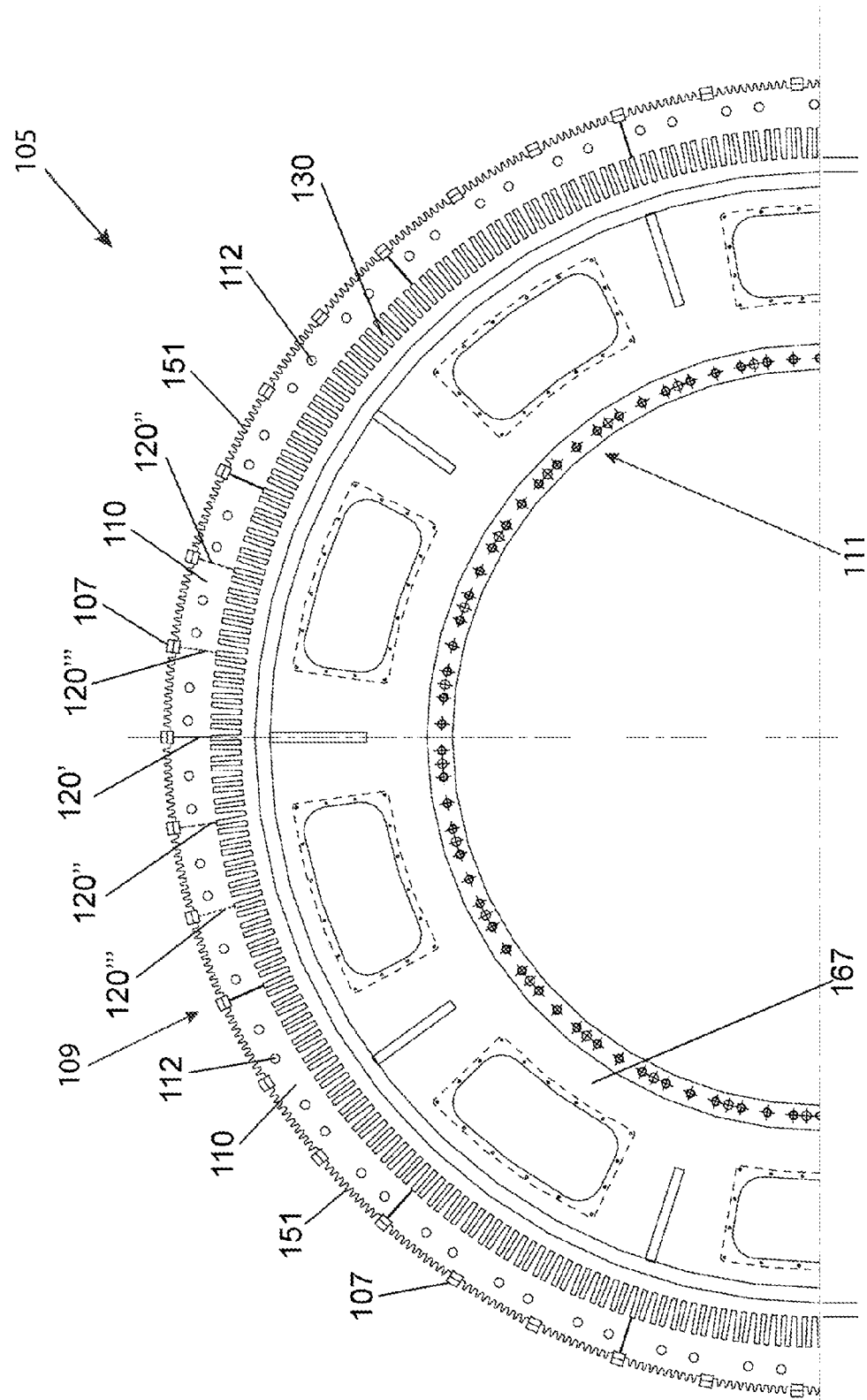
FIG. 2 shows a frontal cross-sectional view of the top half of a direct drive generator.

FIG. 2 shows a cross-sectional view of the top half of the generator 105 with the rotor 109 and stator 111 of the generator 105. Permanent magnets (not shown here but indicated in FIG. 3) of the rotor 109 face arcuate laminates 110 of the stator 111. The arcuate laminates 110 are made of a ferrometal and have a thickness of 0.6 mm (shown with exaggerated thickness and reduced number in FIG. 3). The arcuate laminates 110 have through-holes 112 for tension rods, as will be explained later. Indicated in FIG. 2 (but more clearly visible in FIG. 3) is that the arcuate laminates are provided as a stack of arcuate laminates 110, the outer edge of a lower lying stack of laminates being indicated with a broken line. In the stack, the end-to-end region of two arcuate laminates are covered by another arcuate laminate. An arcuate laminate 110 overlaps with 2 arcuate laminates behind it; with one of the two for ⅔rd of its length, and for the remainder with the other arcuate laminate. The end-to-end regions of the visible arcuate laminates 110 are indicated with 120'; the end-to-end regions of arcuate laminates behind these visible arcuate laminates are indicated with reference number 120", and the end-to-end regions of the arcuate laminates behind these are indicated with reference number 120'''. The through-holes 112 of adjacent laminates of the stack are in register so as to allow the tension rods to pass through the full stack of arcuate laminates 110.

FIG. 2 shows the teeth 130 of the arcuate laminates 110 in which the copper windings (not shown) are inserted. More importantly, it shows the outer edge 151 of first arcuate laminates protruding beyond the outer edges 152 of second arcuate laminates at the outer circumference of the stator 111 for dissipating heat to the atmosphere. The outer edges 151 of stacked first arcuate laminates 110 form the cooling ribs 106 of the generator 105.

Figure 3:
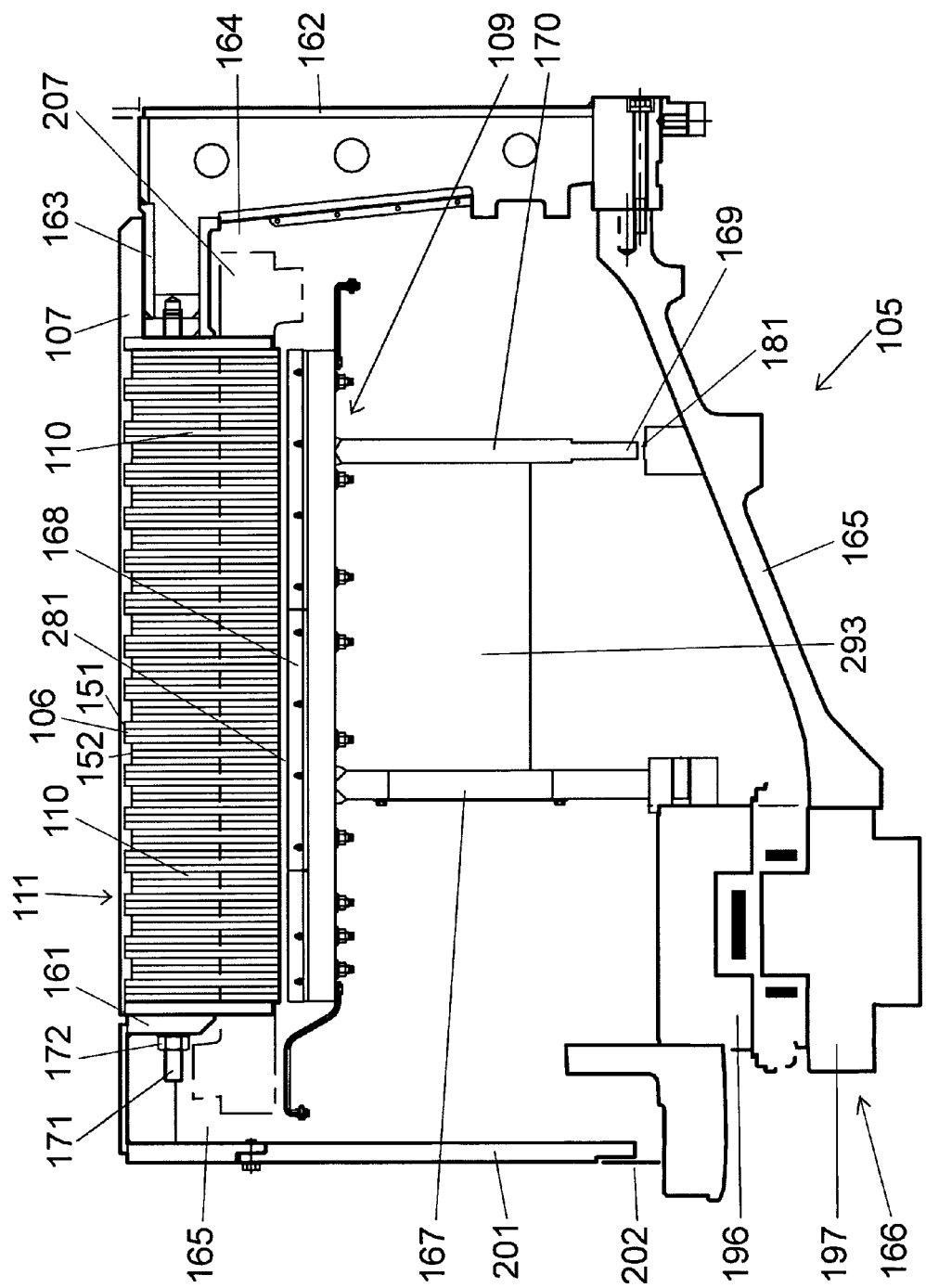
FIG. 3 shows a cross-sectional view of a detail of a generator.

There are also strengthening ribs 107 provided over the circumference of the generator 105, which cover the end-to-end regions (120) of the arcuate laminates 110 to help ensure that no moisture enters the generator 105. They are welded over their full length to the stator 111 (before being impregnated with resin). In the embodiment of FIG. 3, these strengthening ribs 107 are strips of stainless steal that are partially sunk into the concentric cooling ribs 106.

The outside of the generator 105, more specifically the stator 111 is coated with a weather-resistant and in particular moisture-impermeable coating. This can be done in accordance to well-established ISO standards, in particular those for Class 5 protection in marine environments, which offer protection for 20 years and more. Here, the stator is provided with Thermally Sprayed Aluminium, a coating well-known for components used in the off-shore industry. If desired, a sealant may be applied on top of the TSA layer for even better protection against corrosion.

FIG. 3 shows part of the stator 111, and in particular a section of the stack of arcuate laminates 110 under compression between a front plate 161 and a back plate 162. A threaded tension rod 171 is with its threaded end inserted in a threaded hole of the back plate 162, and at the other end of the tension rod 171 a nut 172 has been provided. Hydraulic pressure is applied to the tension rod 171 while the nut 172 is being tightened.

The back plate 162 has a sandwich structure and more specifically has a nose 163 to create room (circular space 164) for the end turns of the copper windings 207 around the teeth 130 shown in FIG. 2 (this figure doesn't show the windings 207 but this is well known to the person skilled in the art). Also at the front end there is a circular space 165 for this purpose.

The back plate 162 is rigidly connected to a carrier cone 165, which in turn is rigidly connected with the inner bearing ring 197 of a bearing 166 (schematically shown). The outer bearing ring 196 of the bearing 166 is rigidly connected to a first rotor flange 167. To ensure rigidity of the rotor 109, there is a second flange 170 parallel to the first rotor flange 167 that is connected to the second rotor flange 170 by a stiffening plate 293. At its outer circumference, the rotor 109 is provided with magnets 168. The inner circumference of the second flange 197 is used as an annular brake disk 169 (braking callipers not shown). There is an air gap at 181 between the inner circumference of the annular break disk 169 and the carrier cone 165. The rotor 109 and the stator 111 are separated by a small air gap 281

The gap 211 between housing member 201 and the bearing section 166 is preferably provided with a seal 202, as is known in the art.

FIG. 3 shows one embodiment of the invention, wherein the first arcuate laminates are the first and last of a first series of laminates, and in contact with second arcuate laminates similarly the first and last of a second series of laminates.

While several components of the generator 105 have been discussed, and steps in the manufacture thereof have been indicated (such as creating the stack of arcuate laminates), it is remarked that both these components and these steps are known. The invention differs in the presence of protruding ribs formed by first arcuate laminations for direct cooling of the stator to the atmosphere.

The invention claimed is:

1. A wind turbine of the horizontal axis, direct-drive type, wherein the wind turbine comprises
    a hub provided with one or more blades, and
    a generator configured to mount to a tower with a centerline that makes an angle with the horizontal of up to +15°, the generator comprising an inner rotor which is driven by the hub and an outer stator, the stator comprising a front plate, a back plate and stacked, arcuate laminate layers, each arcuate laminate layer comprising a plurality of arcuate laminate segments arranged end-to-end, wherein the arcuate laminate segments of each arcaute laminate layer are independently of a size of 360°/n where n is an integer >=2, wherein the end-to-end arrangement of arcuate laminate segments of one arcuate laminate layer is staggered with respect to the end-to-end arrangement of arcuate laminate segments of other arcuate laminate layers about a centreline of the generator, and wherein the front plate and the back plate are connected by tension rods so as to form a stator unit with the stacked, arcuate laminate segments being sandwiched between the back plate and the frontplate under compression, wherein an arcuate laminate segment of a first arcuate laminate layer is in contact with an arcuate laminate segment of a second arcuate laminate layer stacked against the arcuate laminate segment of the first arcuate laminate layer and is in contact with an arcuate laminate segment of a third arcuate laminate layer stacked against the arcuate laminate segment of the first arcuate laminate layer on a side opposite the second arcuate laminate layer, wherein an outer edge of the arcuate laminate segment of the first arcuate laminate layer is at a larger distance from the centerline of the generator than an outer edge of the arcuate laminate segment of the second arcuate laminate layer and an outer edge of the arcuate laminate segment of the third arcuate laminate layer so as to increase the outer surface area of the stator for dissipating heat to the atmosphere.

2. A wind turbine of the horizontal axis, direct-drive type, wherein the wind turbine comprises
a hub provided with one or more blades, and
a generator configured to mount to a tower with a centerline that makes an angle with the horizontal of up to +15°, the generator comprising an inner rotor which is driven by the hub and an outer stator, the stator comprising a front plate, a back plate and stacked, arcuate laminate layers, each arcuate laminate layer comprising a plurality of arcuate laminate segments arranged end-to-end, wherein the arcuate laminate segments of each arcuate laminate layer are independently of a size of 360°/n where n is an integer >=2, and wherein the front plate and the back plate are connected by tension rods so as to form a stator unit with the stacked, arcuate laminate segments being sandwiched between the back plate and the front-plate under compression, wherein an arcuate laminate segment of a first arcuate laminate layer is in contact with an arcuate laminate segment of a second arcuate laminate layer stacked against the arcuate laminate segment of the first arcuate laminate layer, wherein an outer edge of the arcuate laminate segment of the first arcuate laminate layer is at a larger distance from the centerline of the generator than an outer edge of the arcuate laminate segment of the second arcuate laminate layer so as to increase the outer surface area of the stator for dissipating heat to the atmosphere, and wherein a plurality of the arcuate laminates segments of the first arcuate laminate layer each have an outer edge at a first distance from the centerline of the generator, the plurality of the arcuate laminates segments of the first arcuate laminate layer being disposed between arcuate laminate segments of the second arcuate laminate layer and arcuate laminate segments of a third arcuate laminate layer, wherein a plurality of the arcuate laminates segments of the second arcuate laminate layer and a plurality of the arcuate laminates segments of the third arcuate laminate layer each have an outer edge at a second distance from the centerline of the generator, the first distance being larger than the second distance, the plurality of arcuate laminate segments of the first arcuate layer forming a cooling rib.

3. The wind turbine according to claim 1, wherein the outer surface of the stator is covered with a water-impermeable protective coating.

4. The wind turbine according to claim 1, wherein each arcuate laminate segment has at least one through-hole, and the tension rods pass through the through-holes.

5. The wind turbine according to claim 1, wherein the back plate has a sandwich structure.

6. The wind turbine according to claim 1, wherein the centerline of the generator is at an angle of >2° to the horizontal.

7. A direct-drive generator comprising an inner rotor and an outer stator about a centerline, the stator comprising a front plate, a back plate and stacked arcuate laminate layers, wherein each arcuate laminate layer comprises a plurality of arcuate laminate segments arranged end-to-end about the centerline, wherein each arcuate laminate layer includes a plurality of ribs, each rib being disposed to cover end-to-end regions of a pair of associated arcuate laminate segments, each rib configured to inhibit moisture from entering the generator through the end-to-end arrangement of the associated arcuate laminate segments, wherein the front plate and the back plate are connected by tension rods so as to form a stator unit with the stacked arcuate laminate segments being sandwiched between the back plate and the front-plate under compression, wherein a first arcuate laminate segment of a first arcuate laminate layer is in contact with a second arcuate laminate segment of a second arcuate laminate layer being stacked against the first arcuate laminate segment of the first arcuate laminate layer, wherein an outer edge of the first arcuate laminate segment is at a larger distance from the centerline of the generator than an outer edge of the second arcuate laminate segment so as to increase the outer surface area of the stator for dissipating heat to the atmosphere.

8. A direct-drive generator comprising an inner rotor and an outer stator about a centerline, the stator comprising a front plate, a back plate and stacked arcuate laminate layers, wherein each arcuate laminate layer comprises a plurality of arcuate laminate segments arranged end-to-end about the centerline, wherein the front plate and the back plate are connected by tension rods so as to form a stator unit with the stacked arcuate laminate segments being sandwiched between the back plate and the front-plate under compression, wherein a first arcuate laminate segment of a first arcuate laminate layer is in contact with a second arcuate laminate segment of a second arcuate laminate layer being stacked against the first arcuate laminate segment of the first arcuate laminate layer, wherein an outer edge of the first arcuate laminate segment is at a larger distance from the centerline of the generator than an outer edge of the second arcuate laminate segment so as to increase the outer surface area of the stator for dissipating heat to the atmosphere, and wherein a plurality of the arcuate laminates segments of the first arcuate laminate layer each have an outer edge at a first distance from the centerline of the generator, the plurality of the arcuate laminates segments of the first arcuate laminate layer being disposed between arcuate laminate segments of the second arcuate laminate layer and arcuate laminate segments of a third arcuate laminate layer, wherein a plurality of the arcuate laminates segments of the second arcuate laminate layer and a plurality of the arcuate laminates segments of the third arcuate laminate layer each have an outer edge at a second distance from the centerline of the generator, the first distance being larger than the second distance, the plurality of arcuate laminate segments of the first arcuate layer forming cooling ribs.

9. The direct-drive generator according to claim 7, wherein the outer surface of the stator is covered with a water-impermeable protective coating.

10. The direct-drive generator according to claim 7, wherein the arcuate segments have at least one through-hole, and the tension rods pass through the through-holes.

11. The direct-drive generator according to claim 7, wherein the back plate has a sandwich structure.

12. The direct-drive generator according to claim 8 wherein the end-to-end arrangement of arcuate laminate segments of one arcuate laminate layer is staggered with respect to the end-to-end arrangement of arcuate laminate segments of another arcuate laminate layer about the centreline of the generator.

13. The direct-drive generator according to claim 12 wherein arcuate laminate segments of said one arcuate laminate layer cover end-to-end arrangements of arcuate laminate segments of an arcuate laminate layer adjacent to said one arcuate laminate layer.

14. The direct-drive generator according to claim 13 wherein each rib is joined to arcuate laminate segments of a plurality of arcuate laminate layers extending along a length of the stator.

15. The direct drive generator according to claim 14 wherein each rib is fixedly joined to a plurality of arcuate laminate segments over a plurality of arcuate laminate layers.

16. The direct-drive generator according to claim 7 wherein each rib is joined to arcuate laminate segments of a plurality of arcuate laminate layers extending along a length of the stator.

17. The direct drive generator according to claim 16 wherein each rib is fixedly joined to a plurality of arcuate laminate segments over a plurality of arcuate laminate layers.

18. The wind turbine according to claim 1 wherein arcuate laminate segments of said one arcuate laminate layer cover end-to-end arrangements of arcuate laminate segments of an arcuate laminate layer adjacent to said one arcuate laminate layer.

* * * * *